United States Patent

Jane Cabagnero

Patent Number: 5,535,483
Date of Patent: Jul. 16, 1996

[54] LOCKING AND UNLOCKING DEVICE FOR THE FOLDING OF BABY CARRIAGES

[75] Inventor: Ramón Jane Cabagnero, Palau de Plegamans, Spain

[73] Assignee: Jane, S.A., Palau de Plegamans, Spain

[21] Appl. No.: 246,706

[22] Filed: May 20, 1994

[30] Foreign Application Priority Data

Feb. 11, 1994 [ES] Spain ................................. P9400255

[51] Int. Cl.⁶ ............................................... B62B 9/20
[52] U.S. Cl. ........................... 16/115; 280/642; 280/655.1; 280/47.31
[58] Field of Search ..................... 280/642, 650, 280/655, 655.1, 47.371; 16/112, 115

[56] References Cited

U.S. PATENT DOCUMENTS

| | | | |
|---|---|---|---|
| 3,168,330 | 2/1965 | Smith et al. | 280/655.1 |
| 3,522,955 | 8/1970 | Warner, Jr. | 280/655.1 |
| 3,669,463 | 6/1972 | Boudreau | 280/47.371 |
| 3,702,016 | 11/1972 | Keesee | 280/47.371 X |
| 4,660,850 | 4/1987 | Nakao et al. | 280/642 |
| 5,181,735 | 1/1993 | Onishi | 280/650 X |

FOREIGN PATENT DOCUMENTS

P9002663 10/1990 Spain .

*Primary Examiner*—Margaret A. Focarino
*Assistant Examiner*—Michael Mar
*Attorney, Agent, or Firm*—Jacobson, Price, Holman & Stern

[57] ABSTRACT

A locking and unlocking device is provided for the U-shaped handle bar of a baby carriage which slides between folded and unfolded positions on front legs of the carriage. The handlebar has spring hooks which engage pins in the respective legs in the unfolded position and the device includes a manually rotatable disc in the central section of the handlebar connected to the hooks by cables for releasing the hooks from the pins. A manually releasable dog is provided for locking the disc against rotation.

6 Claims, 2 Drawing Sheets

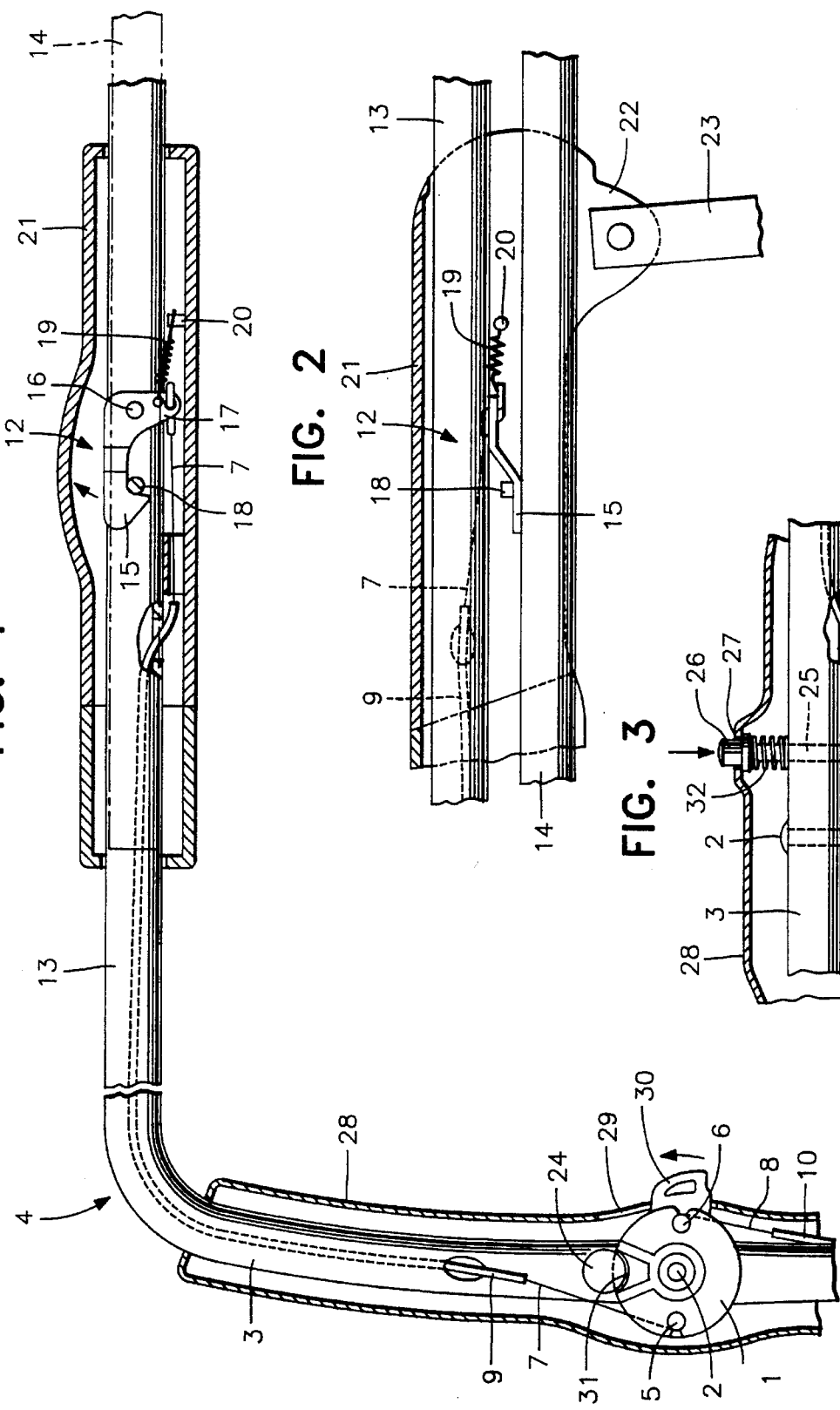

LOCKING AND UNLOCKING DEVICE FOR THE FOLDING OF BABY CARRIAGES

BACKGROUND OF THE INVENTION

This invention refers to a locking and unlocking device for the folding of baby carriages.

This device applies mainly to baby carriages which are folded by sliding a handlebar down onto the front legs of the carriage, and which include between the handlebar and the legs two hook-shaped catches with a lateral unlocking control as can be seen in the folding frame for baby carriages disclosed in Applicants' Spanish patent P9002663.

The objective of this invention is to simplify the unlocking operation, which will be carried out from the handlebar by means of cables.

SUMMARY OF THE INVENTION

A characteristic of the invention is the positioning of the control under the middle handlebar section without it being required to remove the central section, this control being concealed inside a cowling fitted on to said handlebar section, the respective parts of the disc-shaped control and a stopping dog which locks same, projecting from both the lateral and top openings of said cowling, these projecting parts enabling the device to be manually operated.

Another characteristic is that the control acts, via a cable, on lateral hook-shaped catches formed of two L-shaped hooks hinged at the apex in the handlebar branch, these hooks forming at one end a tailpiece through which is connected a corresponding cable and which also joins them to a drag spring which stretches to apply the hooked end of the catches around a pin fixed to the corresponding front leg.

The control consists of a disc to which the cable ends are attached at diametrically opposed points, this disc being clamped along its rim by a disc-shaped stopping dog elastically impelled to its active position. This stopping dog must be unlocked in order to allow rotation of the disc which is to act on the catches to release them from the pins.

The disc-shaped stopping dog is fixed to a spindle which crosses through the handlebar and at the free end terminates in a push-button which projects from the cowling, a spring being provided on the spindle and positioned between the handlebar and the push-button.

The underside of the disc rim is fitted with a housing for the connecting disc-shaped stopping dog, the rim extending into a wing projecting through the cowling via an oblong slot enabling the disc to be manually operated.

To achieve proper hook engagement on the corresponding pin, the hook is stabilized at a correctly aligned position with the pin so that the hook advance always effectively toward the pin. This is achieved by fitting inside the cowling a stop against which the hook bears by its tailpiece, whereby the hook remains stabilized at its correct position.

These and other characteristics will be more easily understood from the detailed description which follows, further explanation being provided by the accompanying page of drawings showing a practical example of use, intended merely as a non-restrictive illustration of the scope of this invention.

BRIEF DESCRIPTION OF DRAWINGS

FIG. 1 is an underside and partially sectioned view of the locking device showing a handlebar and one of the front legs of a baby carriage frame, FIG. 2 is a side elevation of the a hook-shaped catch between the handlebar and the front leg, FIG. 3 is a front elevation of a control disc assembly of the locking and unlocking device.

DESCRIPTION OF PREFERRED EMBODIMENT

Figure 4:
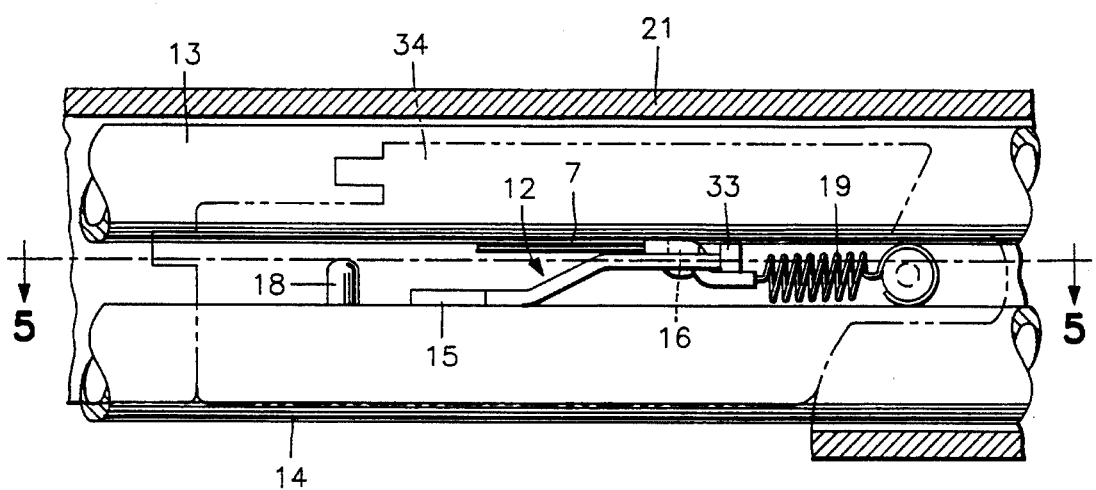
FIG. 4 is a side elevation of a stop arrangement for the hook-shaped catch.
Figure 5:
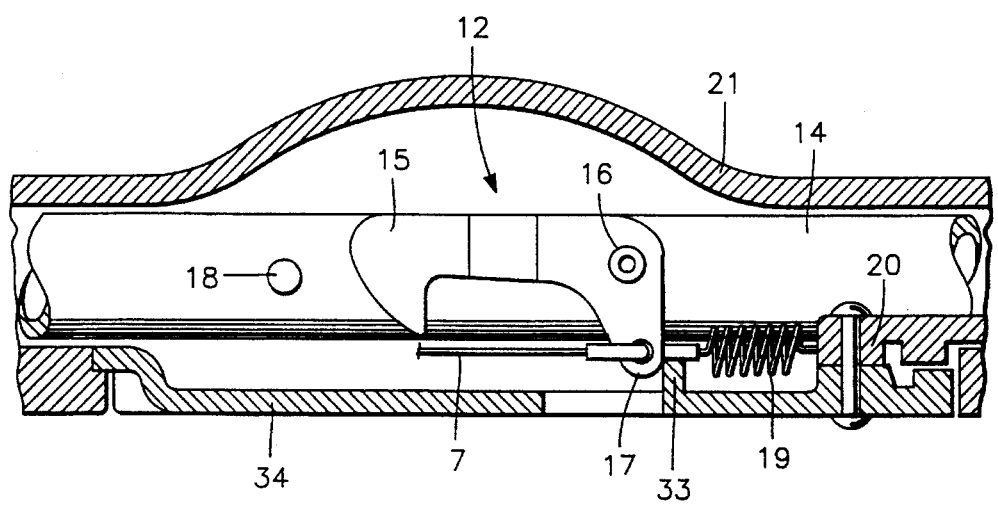
FIG. 5 is a sectional view on line IV—IV of FIG. 4.

As shown in the drawings the device includes a control assembly consisting of a disc 1 rotatably mounted by a shaft 2 underneath the middle section of a U-shaped tubular handlebar 4 of a baby carriage, with two ends of cables 7 and 8 protected by sheaths 9 and 10 being attached to said disc at diametrically opposed points 5 and 6, these cables passing through the interior of the handlebar to join up with hook-shaped catches 12 in each branch 13 of the handlebar which slides over the top end part of the front legs 14 of the baby carriage, these branches sliding down onto said front legs when folding the baby carriage.

The catch 12 includes an L-shaped hook 15 hinged at the apex by means of shaft 16 under branch 13 of the handlebar, the hook connected at its tailpiece 17 with the corresponding cable. The end of hook 15 catches round a pin 18 fixed to the corresponding front leg 14, which position is maintained by the drag action of a spring 19 which connects the tailpiece 17 to an internal protruding pin 20 of a cowling 21 which covers the upper area of the front leg and which along its underside is open forming lugs 22 where the rear legs 23 of the baby carriage are hinged (FIG. 2).

The active position of disc 1 is maintained by a safety catch consisting of a circular dog 24 fixed to a spindle 25 which crosses through the middle handlebar section 3 at its free end is topped by a push-button 26 which projects through an orifice 27 on the upper side of a cowling 28 covering said middle handlebar section 3, this cowling presenting a lateral oblong slot 29 through which protrudes a wing 30 extending radially from the disc 1 and which rotates the disc to unlock the catches 12 by pressing the safety catch which moves the circular dog 24 back to a housing 31 fitted on the underside of the disc rim 1. On the spindle 25 is a spring 32 positioned between the push-button 26 and the middle handlebar section 3, which stretches to press the dog 24 against the disc 1.

The cowling 21 is inwardly provided with a stop 33 against which the catch hook tailpiece 17 is pressed, whereby said hook remains stabilized at its correct position and aligned with the pin 18 of the leg 14. In this way, when the hook 15 is moved towards the pin 18 they will properly engage.

The stop 33 is provided with a small cap 34 to close a side opening inside the cowling 21, said small cap allowing with its removal, an access to the region of the catch 12 to link the cable to the hook and effect replacement if required.

I claim:

1. A locking and unlocking device for a U-shaped handlebar of a baby carriage, said handlebar having a central section and side limbs adapted to slide along respective legs of the carriage between a folded and unfolded position of the handlebar, the device including a sprung hook on each limb of the handlebar, each said hook adapted to engage a pin on a respective one of said legs in the unfolded position of the handlebar, a rotary disc in the central section of the handlebar, a pair of cables attached to the disc at diametrically opposed locations, the cables being attached to the respective sprung hooks for releasing the hooks from the pins by rotation of the disc, means for manually rotating the disc, and a stopping dog member within the central section of the handlebar engageable with and disengageable from the disc to prevent manual rotation of the disc, said dog member having a manual operating element projecting from the central section of the handlebar for disengaging the dog member from the disc.

2. A device as claimed in claim 1, wherein the dog member is carried on a spindle provided with a spring urging the dog member into engagement with the disc and wherein said manual operating element comprises a push-button on one end of the spindle for depressing the spindle against the action of said spring to disengage the dog member from the disc.

3. A device as claimed in claim 1, wherein the disc includes a radially extending wing for manually rotating the disc.

4. A device as claimed in claim 3, wherein the handlebar has a cowling covering the central section and wherein said wing extends through a slot in the cowling.

5. A device as claimed in claim 1, wherein each side limb of the handlebar has a cowling surround formed internally with a pin and wherein each sprung hook includes a spring having one end attached to a tailpiece of the hook and an opposite end attached to the pin in the cowling surround.

6. A device as claimed in claim 5, wherein each cowling surround includes a stop for the tailpiece of a respective hook.

\* \* \* \* \*